United States Patent

Edwards

[11] 4,170,875
[45] Oct. 16, 1979

[54] CASELESS ROCKET DESIGN

[75] Inventor: Lawrence J. Edwards, Camp Springs, Md.

[73] Assignee: The United States of America as represented by the Secretary of the Air Force, Washington, D.C.

[21] Appl. No.: 694,262

[22] Filed: Jun. 10, 1976

[51] Int. Cl.² .................................................. F02K 9/04
[52] U.S. Cl. ..................................... 60/253; 102/49.3
[58] Field of Search ................. 60/253, 254, 255, 270, 60/270 S; 102/49.3

[56] References Cited

U.S. PATENT DOCUMENTS

| | | | |
|---|---|---|---|
| 2,799,987 | 7/1957 | Chandler | 60/270 S |
| 2,995,317 | 8/1961 | Schoppe | 60/270 R |
| 3,008,669 | 11/1961 | Tanczos et al. | 60/270 R |
| 3,032,970 | 5/1962 | Fox | 60/263 |
| 3,379,010 | 4/1968 | Harvey | 60/253 |
| 3,545,212 | 12/1970 | Ludwig | 60/270 R |

*Primary Examiner*—Stephen C. Bentley
*Attorney, Agent, or Firm*—Joseph E. Rusz; Jacob N. Erlich

[57] ABSTRACT

A "caseless" rocket having a solid propellant grain body which as a result of its shape and surface burning creates, in effect, an outer case or barrier formed by the surrounding airstream and the burning propellant. An exhaust "nozzle" is generated as an annulus in which the air stream serves as one surface while the propellant grain serves as the other. Stores or a payload are enclosed within the propellant body.

5 Claims, 2 Drawing Figures

CASELESS ROCKET DESIGN

STATEMENT OF GOVERNMENT INTEREST

The invention described herein may be manufactured and used by or for the Government for governmental purposes without the payment of any royalty thereon.

BACKGROUND OF THE INVENTION

This invention relates generally to "caseless" or "chamberless" rockets, and, more particularly to a "caseless" rocket which utilizes the passing air as an outer case and as a result thereof burns from the "outside-in".

In the conventional rocket engine a metal chamber or case is employed for housing the propellant system of a rocket under elevated pressures. This chamber or case must be precision made so as to be capable of disassembly and to enable insertion of the propellant grain into the system. Large missiles or rockets are usually composed of two power plants, one called the booster and the other the sustainer. The booster is required to provide a high initial thrust to accelerate the missile from takeoff to a very high velocity in a short period of time. As soon as the booster burns out, it is automatically detached to reduce the flight weight of the missile.

In such present rocket motor applications it is customary to employ an expensive case or housing as set forth hereinabove. This case or housing forms the combustion chamber of the rocket. In most instances an exhaust nozzle is attached to the rearward end and the solid propellant material is placed within the case. In addition, the case or housing must have sufficient strength to handle the loads imposed upon it and at the same time must be as light as possible.

During most of the rocket flight a conventional tactical missile is in supersonic flight. Often it is air dropped at 0.8 Mach and quickly boosted to above Mach 1. Usually with the rocket motors of the past, the initial mass fraction of such a missile is well below 100% with the best mass fraction being at the instant of ignition. This mass fraction, however, continuously and progressively degrades to zero at burn out due to the substantial weight of the case, nozzle assembly and other inert parts. Some improvement in overall system performance is achieved by the booster rockets which are ejected after use, however, even such designs still maintain extremely heavy equipment during flight. During the last quarter of burn time, the propulsion devices heretofore in use are operating at a very poor and decreasing mass fraction in which it is doubtful that any useful benefit is being derived from the inert weights. In fact, the inert weight of conventional tactical missiles are ordinarily an important part of the missile cost and contribute to the manufacturing and quality control complexities. It is therefore extremely important to produce a missile or rocket which can maintain nearly 100% mass fraction at all times during flight and accomplish this at a minimum of expense.

SUMMARY OF THE INVENTION

The instant invention overcomes the problems set forth in detail hereinabove by providing a rocket propulsion system designed to have a nearly no-inert penalty and still function as a rocket. This is accomplished by the utilization of an external air sheath as a pressure case (replacing the need for a motor case and the attendant weight of a motorcase) and using the surrounding air to cause a base pressure differential (replacing conventional nozzles).

The solid propellant motor grain of the instant invention is contoured to permit surface burning, with the combustion exhaust products being expanded in the area between the air flow and the air surface. As a result, a net forward thrust is produced by an increase in the base pressure. The supersonic air stream surrounding the burning propellant grain serves as a containment barrier or wall. The nozzles, in a conventional sense, are not present but are, in essence, generated in this invention as an annulus in which the air stream serves as one surface and the propellant grain as the other surface of the nozzle. The head end of the rocket of this invention is designed not only to withstand the stagnation conditions during flight but also to provide a minimum drag penalty and the optimum supersonic aerodynamic shock pattern and air flow over the burning propellant body. The useful payload with this invention is located in the head end section of the rocket and is therefore protected from thermal degradation.

In contrast to conventional solid propellant rockets, no special igniter system is required for the rocket of this invention. For handling and storage, the externally exposed surfaces of the propellant grain of the rocket contain an inhibited coating such as wax or polymer to provide protection of the surface to damage or degradation by either diffusion of propellant ingredients out of the body or penetration and contamination of air or moisture into the propellant body. This inhibited surface also provides rigidity toward mechanical damage either singly or in combination with various reinforcing techniques such as fibers. On launch, this inhibited surface being exposed to a supersonic air stream rapidly degrades to permit ignition and combustion of the propellant grain.

The fundamental concept of this invention is practiced through the use of fuel-rich propellant compositions. The initial combustion process of the contained oxidizer and fuel constituents serve to eject a fuel-rich exhaust composition into the air stream adjacent the propellant surface. Secondary combustion of such exhaust products in the air produces additional heat and mass to further increase the base pressure yielding higher specific impulse and improved propulsion performance. When this invention is applied to solid propellant grains, the surface temperature is principally governed by the propellant composition so that the burning propellant serves as a thermal insulation barrier to protect the unburned propellant from reaching higher temperatures than a maximum defined by the propellant itself. In other words the rocket will burn from "outside-in". Accordingly, external severe environments experienced at very high velocities (i.e., hypersonic flights) do not limit the rocket's usefulness. In fact, the higher flight Mach numbers are more desirable since the air shock is forced closer and more strongly toward the propellant body.

In a conventional rocket design, the exhausting combustion gases are accelerated by expansion through nozzles. Efficient nozzles increase the specific impulse (pounds of force generated per pound of propellant per second) that a propellant provides to push the rocket forward. The specific impulse is often used in conventional rocket designs as a measure of comparing rocket performances. In the instant invention the lack of conventional nozzles would be expected to reduce substantially the performance of the rocket system. Such loss of performance is at least partly restored in the instant invention by burning from the "outside-in" through a pseudo-nozzle created between the air shock layer and the burning rocket body. Furthermore, the fuel-rich nature of the propellant grain in the instant invention, when burned in the surrounding air, substantially increases the rocket performance (in terms of specific impulse) over corresponding combustion of conventional rocket grains. In practice in a flight profile of a tactical missile, the conventional design necessarily requires substantially greater total thrust to deliver a useful payload due to the weight penalties of the inert parts (e.g. case and nozzles) not present in the instant invention.

In sharp contrast to conventional center perforated solid rocket motors of the past, the propellant grains of the rocket of this invention have designed shaping and contouring of surfaces on the outside of the propellant body rather than important internal perforation geometry. Therefore, the quality control, nondestructive testing and inventory inspection of motor usefulness are very much simplified with the instant invention. Furthermore, casting and production of the grains are substantially cheaper and more straightforward. Since a sizeable fraction of the cost of producing a tactical missile is the cost associated with the nozzle assembly, a dramatic reduction in total cost is achieved through this invention. The inert weights of rockets of the past often accounted for one-third of the total tactical rocket propulsion cost while in this invention all such costs are completely eliminated.

It is therefore an object of this invention to provide a rocket design which eliminates the need for a casing and nozzle and thereby substantially reduces the overall weight of the rocket.

It is a further object of this invention to provide a "caseless" rocket design which improves its performance at high Mach numbers.

It is another object of this invention to provide a "caseless" rocket design which produces a very high mass fraction and is therefore extremely efficient in operation.

It is still another object of this invention to provide a "caseless" rocket design which is economical to produce, extremely reliable in operation and which utilizes conventional, currently available components that lend themselves to standard mass producing manufacturing techniques.

For a better understanding of the present invention together with other and further objects thereof reference is made to the following description taken in conjunction with the accompanying drawings and its scope will be pointed out in the appended claims.

DESCRIPTION OF THE DRAWINGS

The Drawing presents two side view schematic representations of the "caseless" rocket design encompassed in this invention.

DETAILED DESCRIPTION OF THE PREFERRED EMBODIMENT

Figure 1:
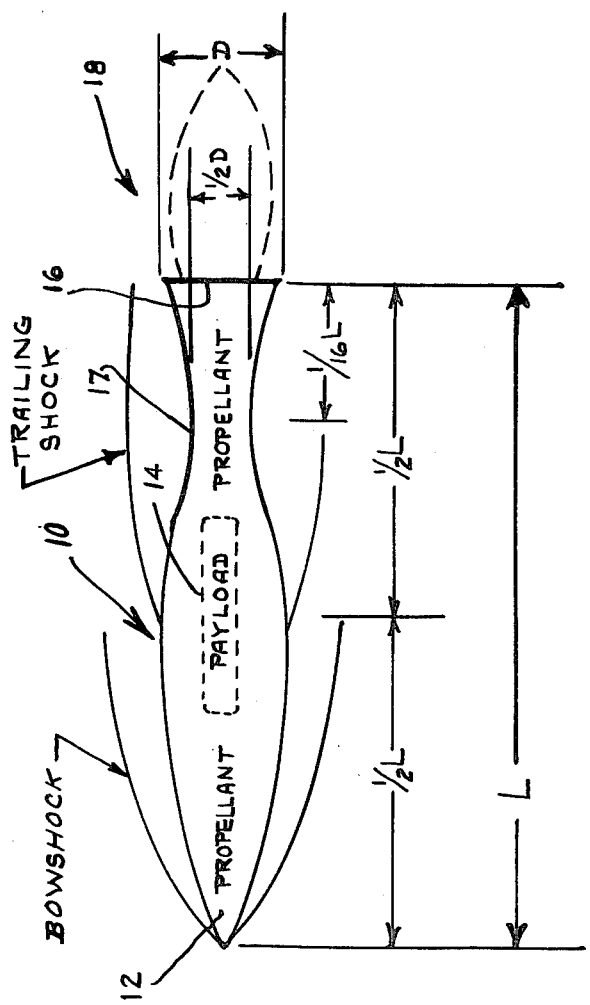
FIG. 1, "Boattail Caseless Rocket Motor Design", illustrates one configuration concept incorporating both side-burning and end-burning modes. Expansion of the combustion gases occurs in the space between the burning external surfaces and the trailing air shock layer.
Figure 2:
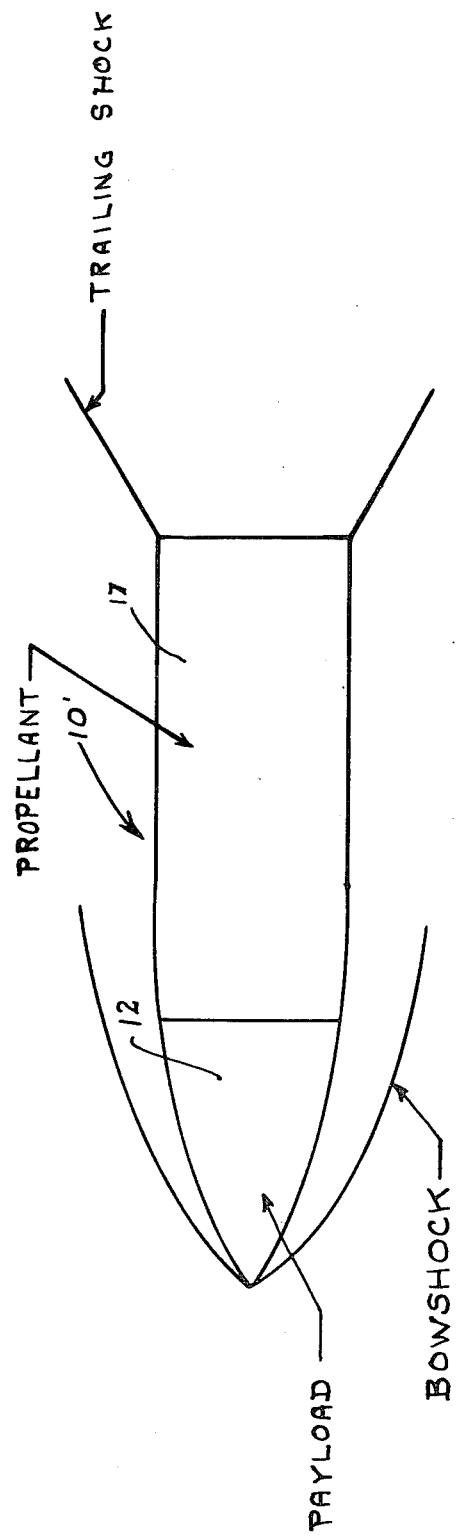
FIG. 2, "End Burning Caseless Design", represents the simplest configuration, which in practice can operate either as a pure end-burner at lower flight velocities (<Mach 4) with inhibited side surfaces or in a combined end and side burning mode at higher flight velocities. As a pure end-burner, combustion gases leave the burning end surface at sonic velocity and the maximum pressure available at the base is governed by the pressure required to separate the turbulent boundary layer on the side of the body. At the higher flight velocities the side propellant surfaces become sufficiently hot to produce combustion of the side body.

Reference is now made to the FIGS. 1 and 2 in the drawing showing in schematic fashion the rocket or missile of this invention. In either design the rocket is manufactured from any suitable solid propellant material such as ammonium perchlorate as the oxidizer component and a butadiene-methylvinylpyridine copolymer binder component formulated with propellant grade aluminum powder such that the final composition possesses a high burning rate, a high specific impulse and high tensile strength suitable for manufacturing the rocket in the configurations to be set forth hereinbelow. Burning rate additives, such as those containing iron or other metals, may be used to produce the high burning rates. When manufacture has been complete, the exposed propellant surfaces are coated with a film of inert inhibitor to prevent damage in handling and chemical changes that may otherwise occur on exposure of the surface to humidity or the environment in storage or transport.

The design of the rocket utilizes an ogive frontal section (12) formed either of ablative, metal or the solid propellant material. The ordnance of the rocket is preferably carried within a hollow center section 14 in FIG. 1. In this design protection to the ordnance package is provided by the surrounding propellant and an ablative or insulating material on the ogive frontal section is not necessary. Since the burning of rocket 10 takes place from the "outside-in" rather than the "inside-out" as in caseless rockets of the past, the embedded ordnance remains intact throughout the rocket flight. An alternate design places the deliverable ordnance package of the missile 10 within the frontal ogive section 12 and is depicted schematically in FIG. 2. In this location the ordnance package requires an outer protective cover of ablative material or other thermal insulating barrier such as used on re-entry vehicles.

The overall dimension of rocket 10 may be considered a distance L, with the thickest portion there of a diameter D being at the rear or tail 16 and at the center section there of at approximately ½ L. The section which forms the "nozzle" 17 of the instant invention is located at a distance approximately 1/6 L from rear 16. Nozzle portion 17 has a width or diameter of between ½ D and ⅝ D. Contrary to the rockets of the past the instant invention completely eliminates the need for costly manufactured nozzles or cases by contouring the surface of rocket 10 as shown in the drawing in order to utilize the surrounding air stream for the formation of a nozzle area 18 for the expanding gases.

The simpler design, shown in FIG. 2, does not possess a contoured side body shape, as in FIG. 1, and can operate at lower velocities as a pure end-burning rocket. However, when the rocket design of FIG. 2 is boosted to velocities in excess of Mach 4, the entire outer propellant surfaces are ignited and the air stream produces a contoured side body shape for optimum flight performance based on the altitude and burn rate characteristics of the propellant employed in manufacture. Thus an initial cylindrical shaped rocket body can be used as a less costly and more easily handled modification of the boattail design shown in FIG. 1. The precise shaping of the side body contour of the rocket shown in FIG. 1 is therefore not critical since the air flow pattern creates the optimum design for the flight velocity and burning rate characteristics of the propellant.

Analysis of the caseless and nozzleless solid propellant rocket motor employing combustion of the propellant on the outer surfaces has shown that acceptable values of specific impulse and thrust can be obtained with solid propellants having sufficiently high burn rates. Specific impulse values are in the range of 180 lbf-sec/lbm, or somewhat lower than corresponding values of conventional solid propellant rocket motors. However, for the same vehicle size and weight, more propellant can be utilized since the caseless and nozzleless rocket operates without most of the inert weight parts of conventional rockets. Therefore, the range of a vehicle propelled may be equal to or much greater than the range of the same payload propelled by a conventional rocket motor. The dynamic stability of a tactical missile that burns on the outer side surfaces, as described in the instant invention, is much better than the dynamic stability of more conventional rear-burning rockets. Due to the relationship of the maximum thrust to the atmospheric pressure, the maximum net thrust of the rocket of the instant invention decreases with increasing altitude, with the best overall results obtained at low altitudes. Also the net vehicle thrust decreases as the cone angle is increased. High maximum thrust levels can be sustained with the caseless rocket motor while attached flow over the vehicle is maintained. The maximum net thrust can be increased by increasing the cone half-angle, increasing flight Mach number, or by decreasing the altitude. The best results are obtained by employing propellants with the highest burn rates. Preferred burn rates are at least of the order of 20 inches/sec although lower rates still provide acceptable performances. For a given vehicle size and weight, the higher burn rate yields higher maximum thrust levels and at higher inherent velocities.

To provide the supersonic velocity required by rocket 10 of this invention, a cannon or gun launching technique could be employed. Any suitable igniter 20 is operatively attached between the launcher (not shown) and rocket 10 so as to activate the ignition of rocket 10 upon the launching thereof. For handling and storage, the extremely exposed surfaces of the rocket propellant contain an inhibited coating such as wax to provide protection of the surface to damage or degradation by either diffusion or propellant ingredients out of rocket 10 or contamination of air or moisture into rocket 10. On launch the inhibited surface being exposed to a supersonic air stream will be rapidly removed, vaporized or burned, to permit ignition and combustion of the propellant grain. With the instant invention the surface temperature of the rocket 10 is principally governed by the propellant composition while the burning propellant serves as a thermal insulation barrier to protect the unburned barrier therebeneath. Accordingly, exterior severe environments experienced at very high velocities (i.e., hypersonic flights) do not limit the rocket's usefulness. In addition, since the nozzle assembly of rockets of the past were extremely costly to produce and inert weights often accounted for as much as one-third of the total rocket propulsion costs, this invention is an extremely economical alternative thereto.

Although this invention has been described with reference to a particular embodiment it will be understood to those skilled in the art that this invention may be practiced by modification of the basic precepts set forth above. For example, liquid propellants could also be used. The combustion liquids could be flowed down from head to tail to provide a uniform burning system similar to the burning system of the solid propellant. Additionally, a pyrophoric fuel could be employed as a liquid propellant to combust in the air stream.

I claim:

1. A "caseless" rocket comprising substantially entirely of a body portion, said body having a centrally located enclosed cavity therein for carrying articles, said body being made substantially completely of solid propellant grain having an ogive frontal section, an enlarged central portion, a concavely-shaped nozzle section and an enlarged rear, said rocket body being of a predetermined length and a variety of predetermined diameters, said largest diameter being at said central portion and said rear, and means operably connected to said propellant body for igniting said rocket whereby utilization of the surrounding air stream forms a nozzle area between said nozzle section and said air stream permitting the burning of said propellant body from the outside-in.

2. A "caseless" rocket as defined in claim 1 wherein said nozzle section is approximately one half the size of said largest diameter.

3. A "caseless" rocket as defined in claim 2 wherein said nozzle section is located a distance substantially one sixth said predetermined length from said rear.

4. A "caseless" rocket as defined in claim 3 further comprising means coating said propellant body for protecting said body from degradation, said coating means being removed during rocket flight.

5. A "caseless" rocket as defined in claim 4 wherein said solid propellant body is composed of ammonium perchlorate as the oxidizer and a butadiene-methylvinylpyridine copolymer as the binder.

* * * * *